United States Patent [19]

Baxter, Jr.

[11] Patent Number: 5,271,289
[45] Date of Patent: Dec. 21, 1993

[54] NON-INVOLUTE GEAR

[76] Inventor: Meriwether L. Baxter, Jr., 86 New Wickham Dr., Penfield, N.Y. 14526

[21] Appl. No.: 991,648

[22] Filed: Dec. 16, 1992

[51] Int. Cl.$^5$ .............................................. F16H 55/08
[52] U.S. Cl. .......................................... 74/462; 74/457; 29/893
[58] Field of Search ........................ 74/457, 460, 462; 29/893

[56] References Cited

U.S. PATENT DOCUMENTS

| Re. 28,926 | 8/1976 | Baxter, Jr. | 74/462 |
|---|---|---|---|
| 2,436,276 | 2/1948 | Wildhaber | 74/462 X |
| 2,994,230 | 8/1961 | Haberland et al. | 74/462 |
| 3,104,557 | 9/1963 | Baxter, Jr. | 74/459.5 |
| 3,583,278 | 6/1971 | Baxter, Jr. et al. | 90/5 |
| 3,631,736 | 1/1972 | Saari | 74/462 |
| 4,031,770 | 6/1977 | Ishikawa | 74/462 |
| 4,051,745 | 10/1977 | Ishikawa | 764/462 |
| 4,651,588 | 3/1987 | Rouverol | 74/462 |
| 4,825,715 | 5/1989 | Buczek et al. | 74/462 |
| 4,899,609 | 2/1990 | Nagata | 74/462 |

FOREIGN PATENT DOCUMENTS

| 58-34264 | 2/1983 | Japan | 74/462 |
|---|---|---|---|
| 62-13866 | 1/1987 | Japan | 74/462 |
| 760091 | 10/1956 | United Kingdom | 74/462 |

OTHER PUBLICATIONS

Introduction to the Kinematic Geometry of Gear Teeth, Allan H. Candee, pp. 1-38.
Gear Handbook, Darle W. Dudley, First Edition, chap. 1.
True Circular-Arc Tooth Profiles Provide Accurate Gears and Precision Bevel Gears Cut Quickly, Ernest Wildhaber, American Machinist, Jun. 7, 1945 and Jun. 21, 1945.
New Tooth Shape Taking Over? Design of Novikov Gear, Nicholas Chrionis, 1967.
A Treatise on the Teeth of Wheels, translation of M. Camus by John Isaac Hawkins, 1868.

Primary Examiner—Leslie A. Braun
Assistant Examiner—David W. Laub
Attorney, Agent, or Firm—Quarles & Brady

[57] ABSTRACT

A family of conjugate gear tooth profiles is taught in which the relative curvature is a maximum near center and decreases toward tip and flank, where sliding is greatest. In one embodiment the radii of curvature of the individual profiles are least at the pitch point and increase toward tip and flank. The permissible tooth heights are limited only by top lands and bottom lands; and any tooth-numbers can be used without resorting to unequal addendums, although unequal addendums can be used if desired.

6 Claims, 5 Drawing Sheets

PRIOR ART
INVOLUTE

FIG. 8(a)

PRIOR ART
CONSTANT RADIUS

NON-INVOLUTE GEAR

FIELD OF THE INVENTION

This invention relates to gears and in particular to a gear tooth shape having improved durability and freedom of design.

BACKGROUND OF THE INVENTION

The invention of the gear precedes Aristotle or approximately 330 B.C. Early gears, intended for operation at low speed or low loads, such as in clockworks, were initially formed by hand with simple tools and jigs. The exact shape of the gear tooth and the effect of shape on strength and durability was of little importance. Early gears used in power transmission applications, in mills and the like, achieved greater strength from increased size and improvements in materials, rather than from a close attention to the shaping of the gear teeth.

Nevertheless, the mathematics of gear tooth shapes was worked out at an early date. These early mathematical analyses suggested that either of two different shapes would be desirable for gear teeth. Both shapes were in the family of mathematical curves called trochoids. The first shape was the epicycloid which is the curve traced by a point on the circumference of the circle as that circle rolls on the outside of a second circle without slipping. The second shape was the involute, which is the curve traced by a point on a line when the line is rolled without slipping on a circle.

Extended mathematical analysis of gear teeth begins effectively with Phillipe de La Hire, in 1694. In addition to his treatise, he designed gearing for a large water works. The treatise discussed the whole family of epicycloids and reached the conclusion that the involute curve was the best of all the exterior epicycloids. The gap between theory and practice is vividly shown by the fact that the involute form for gear teeth was not adopted in practice for 150 years. Mathematical analysis was further advanced by Euler (1754-55), but the involute curve was not mentioned by Camus (1733, 1766) in a treatise that had wide currency. Kaestner, writing in 1781, thought of his work as a systematic treatment of a stable and complete body of knowledge. This treatise may, therefore, be accepted as the close of the work on the abstract analysis of the geometry of motion in wheels and gears. (emphasis supplied) See, Abbott Payson Usher writing in The History of the Gear Cutting Machine. Robert S. Woodbury, p. ii, The Technology Press, MIT (1958)

With the advent of steam power in the early 1800's (and the concurrent need for gears suitable for higher speeds and loads) widespread interest in the exact shape of gear teeth was awakened among manufacturers. By approximately 1840, the involute had been adopted as superior to the epicycloid based on the work of John Hawkins and Robert Willis. Hawkins demonstrated, among other advantages, that the involute shape allowed more than one tooth to be engaged at a given time and further decreased the strain and the sliding to about one-half of that for a similar epicycloidal tooth. Thus, the involute provided more durable teeth.

Although both epicycloidal and involute gears were cut as late as 1880, in 1867 Brown and Sharp brought out a set of formed cutters for involute teeth and by 1898 a survey in American Machinist in Mar. 1898 indicated a near universal acceptance of the involute tooth. Woodbury, at 35.

Two notable exceptions to the near universal use of the involute for power transmission gears are the Wildhaber-Novikov helical gear and the Wildhaber "best circle" circular-arc gear. In both of these gears the gear tooth profile is a circular arc, not an involute. Generally, two meshing gears with teeth that have circular-arc profiles will not have conjugate contacting surfaces. Conjugate tooth profiles are those which allow the transmission of uniform rotary motion from a driving gear to a driven gear. More precisely, the condition of conjugacy requires that: (1) the ratio of the velocity of the two gears in mesh be constant and (2) that the ratio of the velocity of the two gears be equal to the ratio of the numbers of teeth of the two gears.

In the Wildhaber-Novikov helical gear, however, the three dimensional geometry of the helix serves to provide for the smooth transmission of power with a circular arc despite the lack of conjugacy in two dimensions. Hence, conjugacy is obtained when the surface is considered along the axis of the gear.

The Wildhaber "best circle" circular arc gear is not conjugate even in three dimensions. This gear is not suitable for constant use in high power applications but has a great advantage in being simple to manufacture and finds use in applications where wear and durability are of lesser importance. In the Wildhaber circular arc gear, the driven member will lag behind its correct position for either direction of rotation.

With these exceptions, however, the involute shape is generally established for power transmission gears and further investigations into tooth shapes were relatively limited. In 1969, it was noted:

"The difficult mathematics of gears and gear cutting for any tooth on any axis has been almost completely solved. Some of the better known contributors to this work of modern gear theory are Ernest Wildhaber, Earle Buckingham, H. E. Merritt (England), Allen Candee, Werner Vogel, Hillel Poritsky, G. Niemann (Germany), Darle Dudley, Oliver Saari, Charles B. King and Meriwether Baxter". The Evolution of the Gear Art, Darle W. Dudley, p. 65, AGMA (1969).

A basic problem with gears based on the trochoids is that when the tracing point coincides with the rolling point the traced curve has infinite curvature, a condition that is unacceptable in practice. In involute gears, this means that the usable tooth height is limited to the space between the base circles; in order to get sufficient height for motion carryover it is necessary to avoid small tooth-numbers. Even then, the large profile curvature of the involute near the root of the tooth seriously reduces its load-carrying ability. Therefore, as will be seen, the involute is not optimal for applications where durability is critical.

SUMMARY OF THE INVENTION

The present invention provides a method of designing gear tooth profiles with improved durability over the involute as reflected in the relative curvature between contacting points on the profile of meshing teeth. In particular, the method and profiles of this invention provide a class of such profiles that are not based on the mathematical curves of the involute, epicycloid or circle. The profiles of the present invention also provide greater flexibility in selecting small tooth-numbers.

An important element of this invention is the discovery of a technique for defining a gear profile based on a before-the-fact determination of the relative curvature between that profile and a conjugate profile. Normally the relative curvature may be computed only after the profiles have been determined.

Thus, this technique requires an understanding of the relationships which govern the geometry of gear teeth. The results of this technique cannot be reproduced by more generalized iterative methods for computing conjugate profiles known for use with digital computers. This is because the mere ability to find a conjugate profile from an initial profile does not address the problem of selecting the initial profile from an infinite range of possibilities.

It is thus one object of the invention to provide a method of generating profiles based on a predetermined relationship establishing the relative curvature of a profile and its conjugate.

A tooth may be produced by this method having a profile whose radius of curvature is minimum near the center of the profile and increases towards the tip and flank. Together, the profiles of two teeth produced by this method may have a relative curvature, equal to the sum of the reciprocals of their radii of curvature, that is maximum at points of contact near the center of the mesh interval of the profile and less near the ends.

It is thus another object of the invention to provide a gear having comparable strength to gears produced using involute profiles but with improved relative curvature values at points of contact near the roots and tips of the teeth respectively and thus an improved durability.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DETAILED DESCRIPTION OF THE PREFERRED EMBODIMENT

A. Terminology

Figure 1:
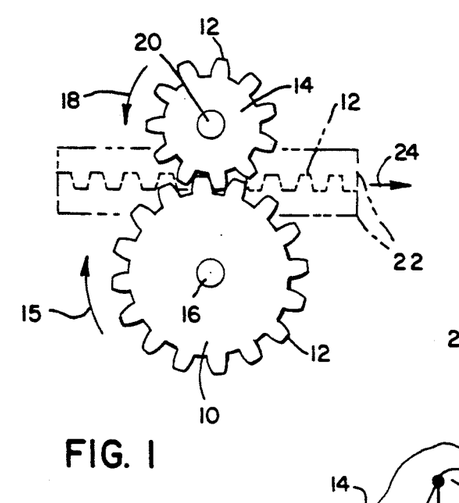
FIG. 1 is a simplified diagram of the meshing of a gear, pinion, and their imaginary conjugate rack showing various terms relevant to the explanation of the present invention.

Referring to FIG. 1, a gear 10 having a plurality of teeth 12 may engage a pinion 14 so that uniform rotary motion 15 about the axis 16 of the gear 10 imparts uniform rotary motion 18 to pinion 14 about pinion axis 20. An imaginary rack 22 engaging both gear 10 and pinion 14 travels with uniform linear motion 24. These conditions of uniform rotary and linear motion imply that the teeth 12 and 12'' the gear 10 and pinion 14 have "conjugate profiles" as do the teet 12 and 12'' of gear 10 and rack 22; and the teeth of pinion 14 and rack 22.

Pinion 14 is so-called because it has fewer teeth 12' than gear 10. It should be understood, however, that the term "gear" may be used generally as not limited to gear 10 but to also include pinion 14 and other tooth shapes that transmit motion, such as blower rotors.

Figure 2:
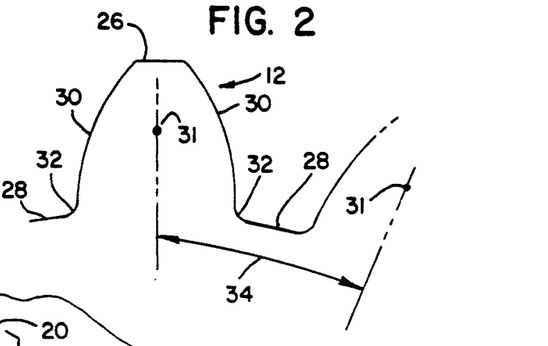
FIG. 2 is an enlarged simplified diagram of a single gear tooth representative of any of the teeth of the gear, pinion, or rack of FIG. 1 and showing the various features of the gear tooth.

Referring now to FIG. 2, each gear tooth 12 includes a top land 26 and a bottom land 28 which are generally segments of cylinders centered about the gear axis 16 and which, during normal operation, do not contact the engaging teeth 12 of another gear. For external gears, the top land 26 is further removed from the axis 16 than is the bottom land 28; the reverse is true for internal gears. The points of contact between meshing teeth 12 occur on the working surface 30 which lies between the top and bottom lands 26 and 28. The angular rotation of a gear 10 during which the working surface 30 of a single tooth 12 is in contact with the working surface of a meshing gear is termed the "mesh interval". Alternatively, the mesh interval may be considered the distance traveled by a rack 22 during which the working surface 30 of a single tooth 12 of the rack 22 is in contact with the working surface 30 of a meshing gear. The working surface 30 connects with the bottom land 28 by means of a fillet 32.

The shape of the working surface 30 is termed the profile and for the simple case of spur gears the profile of the working surface 30 does not vary in a direction along the axis 16. The angular spacing between centers 31 of teeth 12 about the axis 16 is the "angular pitch" 34.

Figure 3:
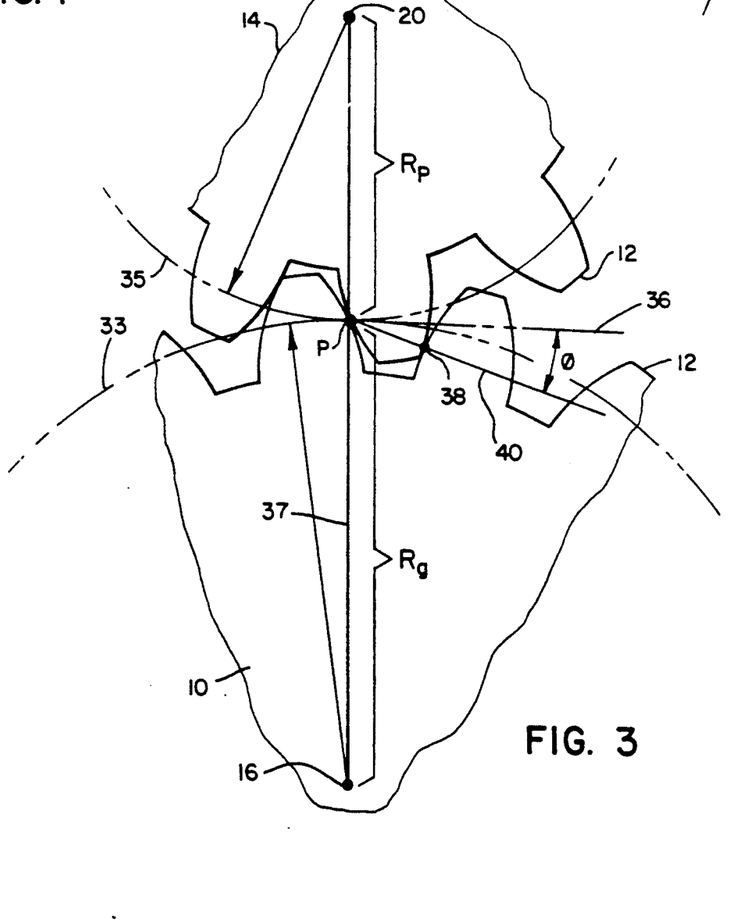
FIG. 3 is a detailed view of a meshing gear and pinion illustrating dimensions used in the present invention's calculation of tooth profiles.

Referring now to FIG. 3, the rotary motion of gear 10 and pinion 14 in engagement will be identical to motion of two pitch circles 33 and 35 rotating about axes 16 and 20 respectively, contacting each other at a pitch point P and rotating together without slipping. The radius of circle 33 for gear 10 is designated $R_g$ and the radius of circle 35 for pinion 14 is designated $R_p$. These radii may be calculated as follows:

$$R_g = \frac{C_0 N_g}{(N_p + N_g)} \quad [1]$$

$$R_p = \frac{C_0 N_p}{(N_p + N_g)} \quad [2]$$

where $C_0$ is the "center distance" and the spacing between the axes 16 and 20 of the gear and pinion 10 and 14, and $N_g$ and $N_p$ are the numbers of teeth 12 and 12" for the gear 10 and pinion 14 respectively. The ratio of gear velocity to pinion velocity during rotation is $N_p/N_g$.

Tangent to the point of contact P of these two pitch circles 33 and 35 is the pitch line 36. The pitch point P lies also on a line of centers 37 between and normal to axis 16 and axis 20.

For any point of contact 38 between the teeth 12 of the pinion 14 and the gear 10, a common normal 40 may be established for the working surfaces 30 of the pinion tooth 12' and the gear tooth 12. This normal 40 forms an angle $\phi$ with the pitch line 36 and passes through the pitch point P. The angle $\phi_0$ when contact occurs at the pitch point P is termed the "pressure angle". In general the angle $\phi$ will vary as the teeth 12 and 12" rotate to new positions.

B. Equations Governing Conjugate Profiles

In general, the profiles of the working surfaces 30 for the gear 10 and pinion 14 are not circular. However, at each point of contact 38 on the working surfaces 30, a radius of curvature may be established which may be thought of as the radius of a circle that best fits the curve at the contact point 38 and at an infinitesimal portion of the working surface 30 on either side of the contact point 38. More generally, the radius of curvature is the rate of change of the surface normal 40 with motion along the working surface 30.

The center of the imaginary circle of radius of curvature is the "center of curvature" and the reciprocal of the radius of curvature is the "curvature". For a typical working surface 30, the radius of curvature will vary for different points along the working surface 30.

Figure 4:
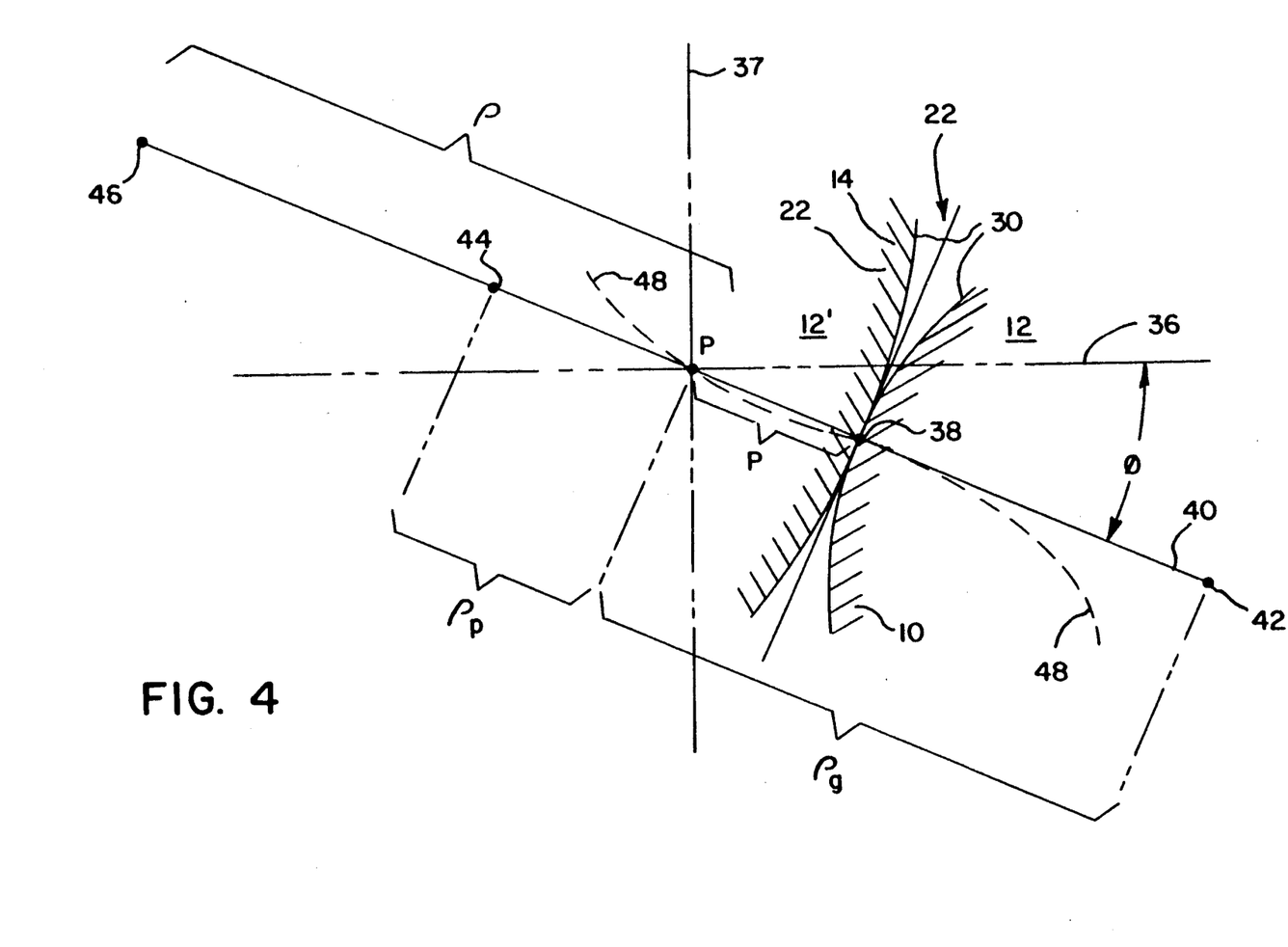
FIG. 4 is an enlarged version of FIG. 3 generalized to a meshing gear, pinion and rack showing further dimensions employed in the present invention.

Referring now to FIG. 4, the center of curvature 42 at contact point 38 of the tooth 12 of gear 10 is a distance $\rho_g$ from the pitch point P. Likewise, the center of curvature 44 of tooth 12' of the pinion 14 is a distance $\rho_p$ from the pitch point P. These two centers of curvature 44 and 42 at contact point 38 of tooth 12 and 12' are related by the Euler-Savary equation as follows:

$$\frac{1}{\rho_p} + \frac{1}{\rho_g} = \frac{1}{\sin(\phi)} \left( \frac{1}{R_p} + \frac{1}{R_g} \right) \quad [3]$$

This equation holds for all conjugate profiles at all points of contact 38. Note that $\rho_p$ and $\rho_g$ are not the radii of curvature of the profiles, but rather the locations of the curvature centers. The radius of curvature of the pinion profile is $\rho_p + L$, and for the gear it is $\rho_g - L$ where L is the distance from the pitch point P.

C. Tooth Profiles with Controlled Curvature

It is useful to consider a particular rack 22 (a gear having an infinite pitch radius) that is conjugate to both gear 10 and pinion 14 with the same contact points 38. The Euler-Savary equation [3] holds also for this rack 22 with a center of curvature 46 at a distance $\rho$ from the pitch point P. In this case:

$$\frac{1}{\rho} + \frac{1}{\rho_g} = \frac{(1/R_g)}{\sin(\phi)} \quad [4]$$

$$\frac{1}{\rho_p} - \frac{1}{\rho} = \frac{(1/R_p)}{\sin(\phi)} \quad [5]$$

As the gear 10, pinion 14 and rack 22 progress through mesh, their common point of contact 38 travels a path of contact 48.

By the conventions described above, the following relations apply:

$$PR_p = \rho_p + L \quad [6]$$

$$PR_g = \rho_g - L \quad [7]$$

$$PR_r = \rho + L \quad [8]$$

where $PR_p$ is the profile radius of the pinion 14, $PR_g$ is the profile radius of the gear 10, and $PR_r$ is the profile radius of the rack 22.

When the path of contact 48 is specified by $\phi$ as a function of L, these two additional differential equations have been developed:

$$\frac{d\phi}{dL} = \frac{1}{\rho} \tan(\phi) \quad [9]$$

$$\frac{dX}{dL} = \frac{1}{\cos(\phi)} \quad [10]$$

where X is the rack position. The development of these differential equations is provided in Appendix II.

The above equations are completely general, and apply to all conjugate profiles.

The present invention provides a means of generating tooth profiles where the relationship between the radii of curvature of the gear and pinion 10 and 14 at their points of contact 38 may be precisely controlled.

In a first embodiment, the difference between the gear and pinion profile radii as a function of L is made to be constant. For an arbitrary such constant value Diff, then $$PR_g - PR_p = \rho_g - \rho_p - 2P = \text{Diff} = \rho_{go} - \rho_{po} \quad [11]$$

where $\rho_{go}$ and $\rho_{po}$ are the values $PR_g$ and $PR_p$ evaluated at the pitch point. With the requirement of equation [11] the above equations [4] and [5] may be manipulated to arrive at the following formula which provides rack curvature center position $\rho$ in terms of the variables L and $\phi$:

$$\frac{1}{\rho} = \frac{2(Q/\sin(\phi) - \Delta R)}{\text{Denominator}} \quad [12]$$

where:

$$Q = \text{Diff} + 2L \quad [13]$$
$$\Delta R = R_g - R_p \quad [14]$$
$$\Sigma R = R_g + R_p \quad [15]$$
$$T = 2 R_p R_g \sin(\phi) \quad [16]$$

$$\text{Denominator} = Q \Delta R + T + \sqrt{Q^2 \Sigma R^2 + T^2} \quad [17]$$

The algebraic manipulation needed to arrive at this result will be understood to those of ordinary skill in the art and is provided in Appendix I below.

Combining equations [12] and [9] provides the first-order differential equation for the path of contact 48 in terms of $\phi$ and L:

$$\frac{d\phi}{dL} = \frac{2}{\text{Denominator}} [Q/\cos(\phi) - \Delta R \tan(\phi)] \quad [18]$$

$$\frac{dX}{dL} = \frac{1}{\cos(\phi)} \quad [10]$$

Any number of points $L_i$ and $\phi_i$ on the path of contact 48 may now be found rapidly by numerical integration performed on a digital computer. This integration is performed by selecting an increment $\Delta X$ to move rack 22 and summing corresponding small increments of $\phi$ and L.

Starting arbitrarily at X equal to zero and $L_0$ equal to zero, for each additional $\Delta X$ a new value $L_i$ is computed as follows:

$$L_i = \Delta X \frac{dL}{dX} + L_{i-1}. \quad [19]$$

Also for each $\Delta X$, and starting arbitrarily at $\phi_0$ equal to the selected pitch point pressure angle, a value of $\phi_i$ may be computed as follows:

$$\phi_i = \left(\Delta X \frac{dL}{dX}\right) \frac{d\phi}{dL} + \phi_{i-1} \quad [20]$$

where again $\phi_0$ is set equal the selected pitch point pressure angle.

In these calculations, the setting of $L_0$ to zero reflects starting the point of contact 38 at the pitch point P.

After sufficient data has been taken with increasing increments of $\Delta X$, a second set of calculations are performed with the gear and pinion 10 and 14 effectively rotating in the opposite direction by employing negative values of $\Delta X$ the above equations [19] and [20] against starting at $L_0 = 0$.

As with any integration, the curve produced includes an arbitrary constant or offset. In a preferred embodiment, this offset is adjusted so that the values of the radii of curvature for L equals 0 are equal to the radii of curvature of the Wildhaber "best circles" circular arc teeth as follows:

$$\rho_{p0} = \frac{3R_g R_p \sin(\phi_0)}{(R_p + 2R_g)} \quad [21]$$

$$\rho_{g0} = \frac{3R_g R_p \sin(\phi_0)}{(2R_p + R_g)} \quad [22]$$

$$\rho_0 = \frac{3R_g R_p \sin(\phi_0)}{(R_g - R_p)} \quad [23]$$

where $\rho_{p0}$, $\rho_{g0}$, $\rho_0$ are the values of $\rho_p$, $\rho_g$, $\rho$ at L=0, respectively and are used to calculate Diff.

Thus, after integration a set of corresponding values $X_i$, $L_i$ and $\phi_i$ are obtained. Each point $X_i$, $L_i$ and $\phi_i$ is a point on the pinion 14, the gear 10, and the rack 22 as they rotate in mesh.

During the integration, the value of rack movement $X_i$ determines the rotation of each gear 10 and 14 that has occurred. That rotation is equal to $X_i$ divided by the pitch radius $R_g$ or $R_p$. Thus, each point $L_i$ and $\phi_i$ on each gear 10 and 14 and rack 22 may be referred back to the starting position of the gear 10 and 14 to build up pictures of the profiles.

More specifically, the X value may be used to derive an angle $\alpha$ indicating the rotation of the gear 10 or pinion 14 per equations [1] and [2] above and calculation of the circumference for $R_g$ or $R_p$. The tooth profile may then be reconstructed in x and y coordinates by straightforward trigonometric calculation. In this calculation, the x and y coordinates of a given point on the profile of the tooth associated with each value of $X_i$, $L_i$ and $\phi_i$ will be the terminus of a vector starting at a point on the pitch circle or 35 of the gear 10 or pinion 14 and displaced from line of centers 37 by the rotation $\alpha$ of the gear 10 or pinion 14, the vector being oriented at angle $\phi_i + \alpha$ and being of length $L_i$.

The values of $\rho_g$, $\rho_p$ and $\rho$ may be readily determined by equations [12] and [4] or [5]. The tables of Appendix III provide calculated points for one example of the present gear tooth shape which will be termed a Controlled Curvature Profile (CCP).

Figure 5:
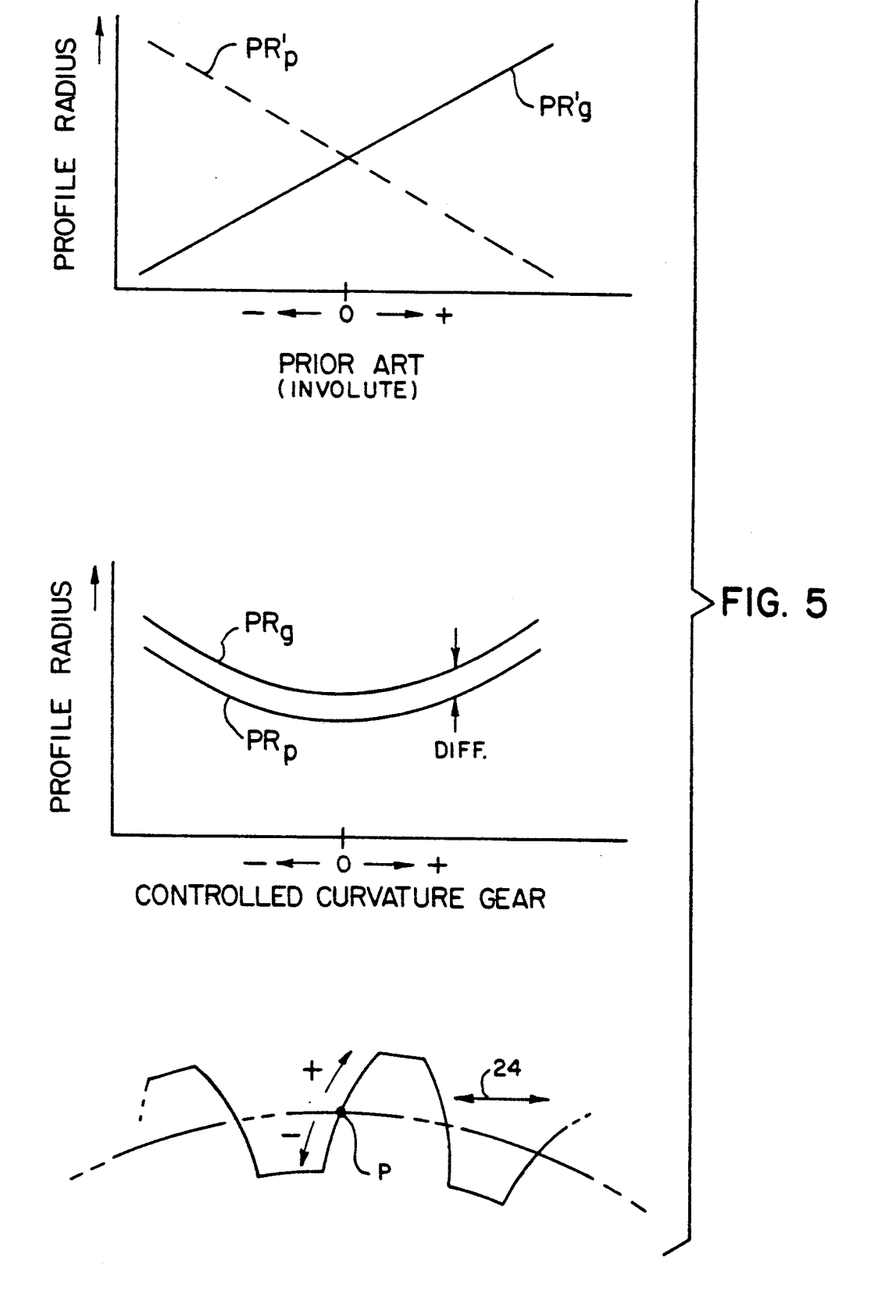
FIG. 5 is a schematic view of a tooth having a point of contact at the pitch point and showing direction of displacement of the contact point from the pitch point with translation of the rack together with corresponding graphs plotting profile radius against rack motion both for a controlled curvature gear of the present invention and a gear using that prior art involute.

Referring now to FIG. 5, the profile radii $PR_g$ and $PR_p$ of the gear and pinion 10 and 14 for the present invention, for a 20/20 tooth combination, may be compared to a profile radii $PR'_g$ and $PR'_p$ of a prior art involute based gear and pinion. For the prior art involute, the radius of curvature of either profile decreases rapidly as the contact point 38 approaches the bottom land 28 of the tooth 12. In this instance, the involute has a drastic five-fold change in profile radius from the bottom to tip, i.e., the working surface near the bottom land 28 and the top land 26, respectively. For the CCP gear of the above embodiment, the radius of curvature for both profiles is minimal when the contact point 38 is at the approximate center of the working surface 30 and increases from that point in either direction. The relative curvature at the critical ends of mesh has been reduced more than 60%.

Figure 6:
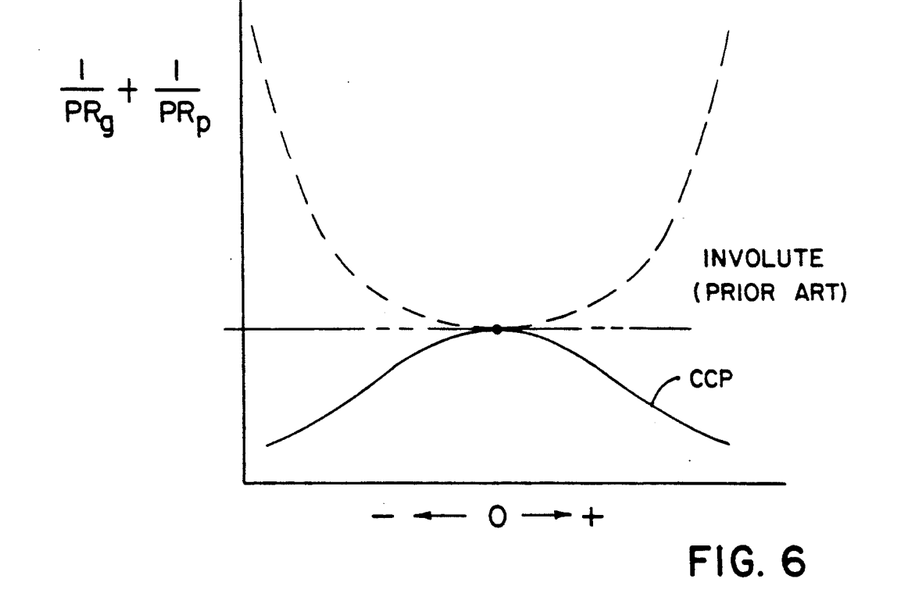
FIG. 6 is a graph of relative curvature versus displacement of the rack from the pitch point showing a prior art involute versus a controlled curvature gear constructed according to the present invention.

Referring to FIG. 6, the relative curvature of the prior art involute and CCP tooth of the present invention may be compared. The relative curvature at any point of contact 38 is the sum of the curvatures of the two profiles. This, together with the sliding velocity, is known to be a measure of gear surface distress. For the prior art involute profile the relative curvature is greatest at the tooth tips where sliding is greatest, i.e. at points of contact 38 most removed from the pitch point P. In contrast, with the CCP tooth, the relative curvature of the profiles described actually decreases where the sliding is greatest.

Table I shows calculated results for three pinion/gear pairs, one constructed with prior art involute profiles and the other two constructed according to the present invention (CCP). The present invention allows combinations of teeth numbers for gears 10 and pinions 14 that are not practical for involute teeth profiles. The 5/20 example is such a case.

The calculations indicated are for 1 diametral pitch with sliding velocities given for unit relative angular velocities. Of particular interest is the measure of surface distress. Although the interaction of relative curvature and sliding in causing surface failure is not agreed on, the distress number provided in Table 1 is a sample of a number that indicates one combination of curvature and sliding to represent surface distress and is calculated as the product of the sliding velocity and the square root of the relative curvature. The present invention provides reduced surface distress for comparable gear/pinion pairs.

The bending stresses in Table I are calculated by the Lewis method, with the load at the highest point of single-tooth loading. The effect of the radial component of load is included. The fillet radius is calculated at the point of maximum stress.

TABLE I
DATA

| | | | | |
|---|---|---|---|---|
| Teeth (pinion/gear) | | 20/20 | 20/20 | 5/20 |
| Pressure Angle | | 20 | 20 | 20 |
| Working Depth | | 2.0 | 2.0 | 2.0 |
| Clearance | | .15 | .15 | .15 |
| Profile Type | | Involute | CCP | CCP |
| Radius Difference | | N/A | N/A | 0.57 |
| | Pinion | | | |
| Contact Ratio | | 1.557 | 1.434 | 1.135 |
| Topland | | 0.695 | 0.651 | 0.327 |
| Tip Relative Curvature | | 1.066 | 0.412 | 0.721 |
| Tip Sliding Velocity | | 2.298 | 2.100 | 1.771 |
| Surface Distress Number | | 2.373 | 1.348 | 1.504 |
| Bending Stress | | 1.363 | 1.361 | 4.776 |
| Fillet Ratio | | 0.629 | 0.639 | 0.643 |
| | Gear | | | |
| Contact Ratio | | | | 1.135 |
| Topland | | | | 0.404 |
| Tip Relative Curvature | | | | 0.670 |
| Tip Sliding Velocity | | | | 1.485 |
| Surface Distress Number | | | | 1.216 |
| Bending Stress | | | | 1.388 |
| Fillet Ratio | | | | 0.708 |

It will be apparent from the above discussion and the examples provided that the relationship between the radii of curvature difference Diff of the two conjugate profiles on the CCP tooth may be according to a more complex formula and need not be limited to a constant value. In particular the term Diff in equation [11] may be made a function of L rather than a constant. This is done by adding terms to the value of Q as follows:

$$Q = Diff + 2L + K_1 L + K_2 L^2 + K_3 L^3 + K_4 L^4 \quad [24]$$

Coefficients of odd powers of L shift the profile readius curves shown in FIG. 5 apart sidewise, making the profiles slightly more or less involute-like. Coefficients of even powers make the change of profile radius with rotation less on one member and more on the other. These variations provide additional flexibility in selecting gear designs that may provide more strength and durability as discussed above.

Further, by departing from the Wildhaber "best circle" radii at the pitch point (equations [21]-[23]), the phase of mesh where the relative curvature is maximal is displaced. This is particularly important for designs with unequal addenda, where it may be desired to put the maximum near the center of the mesh.

With the values of the tooth profiles for an arbitrary number of points computed by the above methods, the gears of the present invention or the tools to make them may be manufactured on conventional digitally controlled machinery. Profiles must be calculated from the tip of each member to the point on its flank where the fillet curve is to be attached.

Figure 8A:
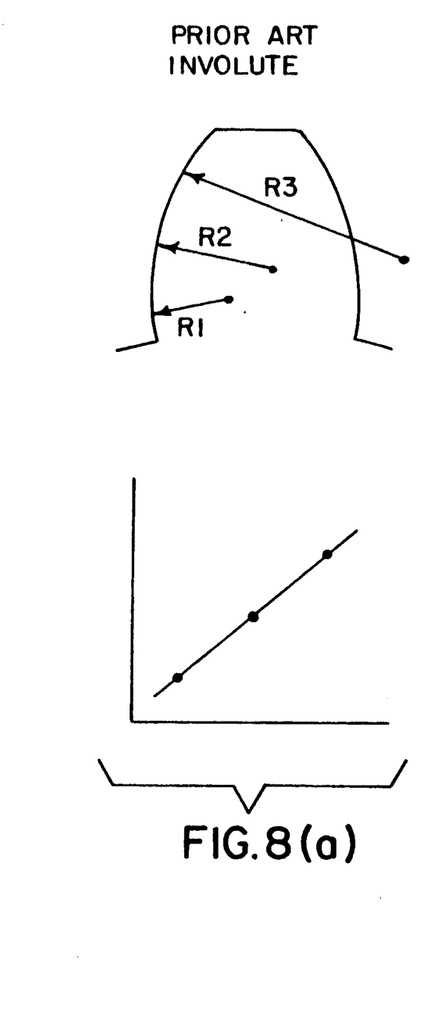
FIGS. 8(a) through 8(c) are simplified pictorial representations of three gear teeth cut according to prior art involute and constant radius shapes and the present invention above respective graphs of radius of curvature on the vertical axis plotted against position along the profile of the gear tooth plotted on the horizontal axis.
Figure 8B:
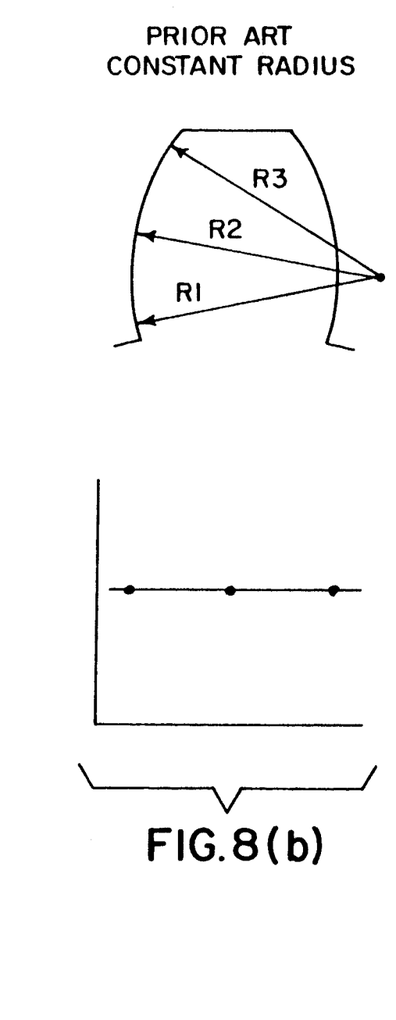
Figure 8C:
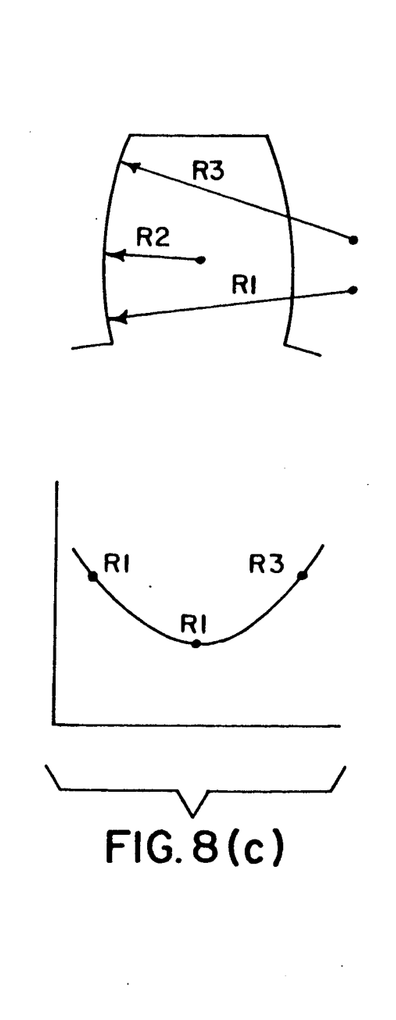

The fillet which connects the main profile with the root circle is important in determining the tooth strength and may be any desired shape, so long as it is tangent to the main profile at the junction, and tangent to the root circle, while leaving a small bottom flat. The shape of the fillet may be generated by assuming the fillet is the path of a circular edge-round on the rack tip. One fillet of this type is provided in Appendix III. Referring to FIG. 8(a) prior art involute gears have an increasing radius of curvature as one moves from the bottom to the top lands along the tooth height as represented by three radii $R_1$, $R_2$, and $R_3$, where $R_1 \leq R_2 \leq R_3$. In contrast, constant radius of curvature gears, such as the Wildhaber circular arc gears, have a constant radius of curvature as shown in FIG. 8(b) where $R_1 = R_2 = R_3$. The present invention, as shown in FIG. 8(c) has a radius of curvature that is minimum, as shown by radius $R_2$, near the center of the tooth height where $R_2 < R_1$ and $R_2 < R_3$.

Many modifications and variations of the preferred embodiment which will still be within the spirit and scope of the invention will be apparent to those of ordinary skill in the art. For example, it is common practice in gear manufacture to modify conjugate profiles on one or both members by small, carefully chosen amounts, to prevent gear failure due to misalignment, deflection under load, or manufacturing errors. It is clear that such modifications can easily be included in the calculation of the profiles, and that these in no way negate the advantages of the new profiles. Further, it will be apparent that exactly analogous advantages can be obtained for bevel gears merely by using spherical geometry in place of plane geometry described herein; and for internal gears by appropriate sign conventions. In order to apprise the public of the various embodiments that may fall within the scope of the invention, the following claims are made:

Appendix I

This appendix provides a derivation of the expression of equation [12].
Assuming a constant difference, Diff:

$$Diff = RP_g - RP_p \quad [1a]$$
$$= \rho_g - \rho_p - 2L \quad [2a]$$
$$= \rho_g 0 - \rho_p 0 \quad [3a]$$

and from equations [4] and [5] provided above, where $R_g = R$ and $R_p = r$:

$$\rho_g = \cfrac{1}{\left(\cfrac{1}{R\sin\phi} - \cfrac{1}{\rho}\right)} = \frac{\rho R \sin\phi}{\rho - R\sin\phi} \quad [4]$$

$$\rho_g = \cfrac{1}{\left(\cfrac{1}{r\sin\phi} + \cfrac{1}{\rho}\right)} = \frac{\rho r \sin\phi}{\rho + r\sin\phi} \quad [5]$$

then, substracting equation [4] from [5]:

$$\rho_g - \rho_p = \rho\sin\phi \left( \frac{R}{\rho - R\sin\phi} - \frac{r}{\rho + r\sin\phi} \right) \quad [4a]$$

$$= \rho\sin\phi \left( \frac{(\rho R + rR\sin\phi - \rho r + rR\sin\phi)}{(\rho - R\sin\phi)(\rho + r\sin\phi)} \right) \quad [5a]$$

Noting that $\rho_g - \rho_p = $ Diff $+ 2L$ by equation [1b]:
$$(Diff + 2L)(\rho^2 - \rho(R - r)\sin\phi - rR\sin^2\phi) = \rho^2(R - r)\sin\phi + 2\rho r R \sin^2\phi \quad [6a]$$

Simplifying Diff as D, then:
$$\rho^2[(D + 2L) - (R - r)\sin\phi] - \rho[(D + 2L)(R - r)\sin\phi + 2rR\sin^2\phi] - (D + 2L)rR\sin^2\phi = 0 \quad [7a]$$

Let $Q = D + 2L$ and $\Delta R = (R - r)$ then:

$$\rho^2 \left[ \frac{Q}{\sin\phi} - \Delta R \right] - \rho[Q\Delta R + 2rR\sin\phi] - QrR\sin\phi = 0 \quad [8a]$$

By the quadratic formula:

Appendix I-continued $$2\rho \left[ \frac{Q}{\sin\phi} - \Delta R \right] \quad [9a]$$

$$= Q\Delta R + 2rR\sin\phi \pm$$

$$\sqrt{(Q\Delta R + 2rR\sin\phi)^2 + 4\left(\frac{Q}{\sin\phi} - \Delta R\right)QrR\sin\phi}$$

$$= Q\Delta R + 2rR\sin\phi \pm \sqrt{(Q^2(\Delta R^2 + 4rR)) + 4r^2R^2\sin^2\phi} \quad [10a]$$

Expanding $\Delta R$ as $(R - r)$ yields:

$$= Q\Delta R + 2rR\sin\phi \pm \quad [11a]$$

$$\sqrt{(Q^2(R^2 - 2rR + r^2 + 4rR)) + 4r^2R^2\sin^2\phi}$$

$$= Q\Delta R + 2rR\sin\phi \pm \sqrt{(Q^2(R + r)^2) + (2rR\sin\phi)^2} \quad [12a]$$

Let $(R + r) = \Sigma R$, then:

$$\frac{1}{\rho} = \frac{2\left[\frac{Q}{\sin\phi} - \Delta R\right]}{[Q\Delta R + 2rR\sin\phi \pm \sqrt{(Q^2\Sigma R^2) + (2rR\sin\phi)^2}} \quad [13a]$$

$$\frac{1}{\rho} = \frac{2(Q/\sin(\phi) - \Delta R)}{\text{Denominator}} \quad [12]$$

where:
$Q = \text{Diff} + 2L$ [13]
$\Delta R = R_g - R_p$ [14]
$\Sigma R = R_g + R_p$ [15]
$T = 2 R_p R_g \sin(\phi)$ [16]

$$\text{Denominator} = Q \Delta R + T + \sqrt{Q^2 \Sigma R^2 + T^2} \quad [17]$$

The positive sign of the radical is chosen because it yields convex tooth profiles as desired.

Appendix II

The differential relationships of equations [9] and [10]:

$$\frac{d\phi}{dL} = \frac{1}{\rho} \tan(\phi) \quad [9]$$

$$\frac{dX}{dL} = \frac{1}{\cos(\phi)} \quad [10]$$

may be demonstrated by considering a system comprising two meshing conjugate gears and an imaginary rack conjugate to both gears. The path of the common point of contact can be readily calculated from the known profile shape of any of the three members by using the principle that the common normal to the profiles at contact passes through the pitch point. The known profile shape must be sufficiently described for the location of any number of points on the profile to be calculable, as well as the direction of the profile normals at those points.

Thus, the profile shape of one member defines the path of contact.

Figure 7:
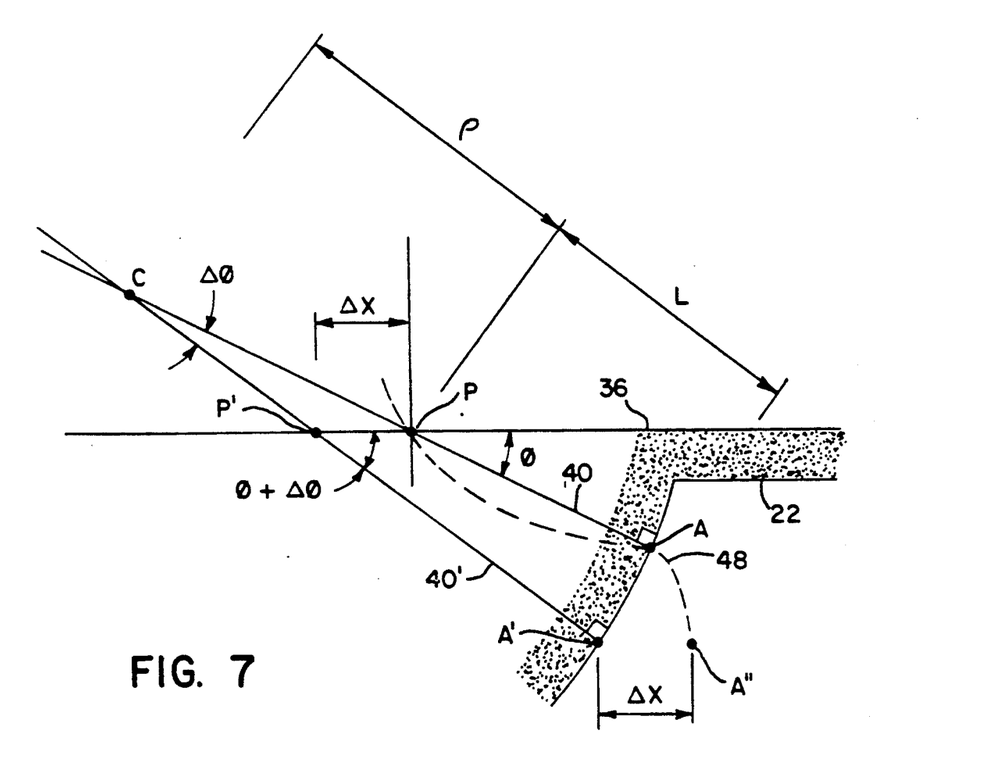
FIG. 7 is a schematic view of a tooth of a rack with displacement of the rack showing dimensions relevant to the discussion of Appendix II.

FIG. 7 shows a tooth of a rack 22 and a point A on its profile, at which the normal is 40. P is the pitch point. Since the normal contains point P, point A is a point of contact between the three members, and therefore a point on the path of contact 48. It is convenient to locate Point A by its distance L from the pitch Point P and an angle $\phi$ that the normal 40 makes with the pitch line 36. The equation of the path of contact 48 can therefore be expressed generally in terms of $\phi$ as a function of L:

$$\phi = f(L),$$

which is an unusual form of polar coordinates.

In order to find the nature of this function as it relates to the given rack profile, consider a second point A' on the rack 22 an infinitesimal distance from A, where the slope of the normal has increased to $(\phi + \Delta\phi)$. The new normal 40' intersects the pitch line at P', a distance $\Delta X$ from P. In order for A' to be a contact point, P' will have to move to P and A' to A" on the path of contact 48. $\Delta X$ is the necessary rack displacement and $\Delta L$ is the incremental increase in the value of L.

Next consider the intersection C of the normals 40 and 40'. C is the center of curvature of the rack profile at A and A' since the distance AA' is infinitesimal, and the center of curvature is defined as the intersection of adjacent normals. Also CA=CA' since C is the center of curvature. The distance CP has previously been assigned the symbol $\rho$.

The following relations between $\rho$, $\Delta\phi$, $\Delta X$, and $\Delta L$ are obtained from trigonometry and inspection of the diagram:

From the triangle CPP', by the law of sines:

$$\Delta X/\sin(\Delta\phi) = \rho/\sin(\phi + \Delta\phi). \quad [1b]$$

$$CP/\sin(\phi) = \rho/\sin(\phi + \Delta\phi). \quad [2b]$$

From the diagram: P'A=CA'=CP' and CA'=CA=$\rho$+L and P'A' is the new value of L=L+$\Delta$L
Therefore: L+$\Delta$L=$\rho$+L−CP'

$$\Delta L = \rho - \rho \frac{\sin(\phi)}{\sin(\phi + \Delta\phi)} \text{ from [2b]} \quad [3b]$$

Now considering the trigonometric identity:

$$\sin(\phi + \Delta\phi) = \sin(\phi)\cos(\Delta\phi) + \cos(\phi)\sin(\Delta\phi)$$

and the Taylor series expansions for sine and cosine:

$$\sin(\Delta\phi) = \Delta\phi - \frac{1}{6}\Delta\phi^3 + \ldots$$

$$\cos(\Delta\phi) = 1 - \frac{1}{2}\Delta\phi^2 + \ldots$$

it follows that:

$$\sin(\phi + \Delta\phi) = \sin(\phi)\left(1 - \frac{1}{2}\Delta\phi^2 + \ldots\right) +$$

$$\cos(\phi)\left(\Delta\phi - \frac{1}{6}\Delta\phi^3 + \ldots\right)$$

$$= \sin(\phi) + \cos(\phi)\Delta\phi + \epsilon$$

where $\epsilon$ collects higher ordered terms that are small and hence neglected.

From [1b]:

$$\Delta X(\sin(\phi) + \cos(\phi)\Delta\phi) = \rho\Delta\phi$$

or, neglecting the high order product $\Delta X \Delta \phi$:

$$\Delta X \sin(\phi) = \rho \Delta \phi$$

$$\frac{d\phi}{dX} = \frac{1}{\rho} \sin(\phi) \quad [4b]$$

From [3b]:

$$\Delta L = \rho(1 - \sin(\phi)/\sin(\phi + \Delta\phi))$$

$$\Delta L(\sin(\phi) + \cos(\phi)\Delta\phi) = \rho(\sin(\phi + \Delta\phi) - \sin(\phi))$$

$$\Delta L(\sin(\phi) + \cos(\phi)\Delta\phi) = \rho(\sin(\phi) + \cos(\phi)\Delta\phi - \sin(\phi))$$

$$\Delta L \sin(\phi) = \rho \cos(\phi) \Delta \phi$$

$$\frac{d\phi}{dL} = \frac{1}{\rho} \tan(\phi)$$

From [3b]:

$$\frac{dX}{dL} = \frac{d\phi}{dL} \Big/ \frac{d\phi}{dX}$$

$$\frac{dX}{dL} = \frac{1}{\cos(\phi)} \quad [10]$$

Appendix III

Example of a 5 by 20 Pinion/Gear Pair According to the Present invention with Constant Radius Difference.

I. Design Parameters

| Parameter | Value | Value |
|---|---|---|
| Teeth Numbers | 5 | 20 |
| Pressure Angle | 20 | |
| Working Depth | 2 | |
| Addendum Shift | 0 | |
| Gear Thickness Increase | | .1 |
| Clearances | .15 | .15 |
| Minimum Bottom Land | | .05 |
| Safety Distance | .05 | |
| Total points per pitch: | | 2000 |
| Points skipped for printing: | | 400 |
| Points on fillet: | 8 | |
| Pitch Radii | 2.5 | 10 |
| Addendums | 1 | 1 |
| Dedendums | 1.15 | 1.15 |
| Angular Thickness | 33.70817 | 9.572958 |
| Wildhaber Radii | 1.140067 | 1.710101 |
| Radius Difference | | .57 |

II. Calculated Data

Table Key

Rotation
pitch

| pinion x coord. | pinion y coord. | pinion profile radius |
| gear x coord. | gear y coord. | gear profile radius |
| rack x coord. | rack y coord. | path of contact x coord. | path of contact y coord. | relative curvature between pinion and gear |

Pinion Addendum/Gear Flank Points

| | | | | |
|---|---|---|---|---|
| 0.0000 | | | | |
| 0.0000 | 0.0000 | 1.1401 | | |
| 0.0000 | 0.0000 | 1.7101 | | |
| 0.0000 | 0.0000 | 0.0000 | 0.0000 | 1.4619 |
| 0.2000 | | | | |
| −0.1194 | −0.2402 | 1.4080 | | |
| −0.0517 | −0.1676 | 1.9780 | | |
| −0.0625 | −0.1838 | 0.5658 | −0.1838 | 1.2158 |
| 0.4000 | | | | |
| −0.3881 | −0.5605 | 1.9356 | | |
| −0.0817 | −0.3027 | 2.5056 | | |
| −0.1223 | −0.3689 | 1.1344 | −0.3689 | 0.9158 |

Pinion Tip

| | | | | |
|---|---|---|---|---|
| 0.5940 | | | | |
| −0.8574 | −0.8944 | 2.5181 | | |
| −0.1024 | −0.4269 | 3.0891 | | |
| −0.1907 | −0.5741 | 1.6755 | −0.5741 | 0.7207 |
| 0.6000 | | | | |
| −0.8757 | −0.9041 | 2.5377 | | |
| −0.1030 | −0.4307 | 3.1077 | | |
| −0.1930 | −0.5809 | 1.6920 | −0.5809 | 0.7158 |

Interference Point

| | | | | |
|---|---|---|---|---|
| 0.6155 | | | | |
| −0.9238 | −0.9289 | 2.5857 | | |
| −0.1044 | −0.4406 | 3.1557 | | |
| −0.1991 | −0.5987 | 1.7345 | −0.5987 | 0.7036 |

Gear Addendum/Pinion Flank Points

| | | | | |
|---|---|---|---|---|
| 0.0000 | | | | |
| 0.0000 | 0.0000 | 1.1401 | | |
| 0.0000 | 0.0000 | 1.7101 | | |
| 0.0000 | 0.0000 | 0.0000 | 0.0000 | 1.4619 |
| −0.2000 | | | | |
| 0.0517 | 0.1891 | 1.4788 | | |
| 0.1199 | 0.2616 | 2.0488 | | |
| 0.1037 | 0.2489 | −0.5247 | 0.2489 | 1.1643 |
| −0.4000 | | | | |
| 0.0786 | 0.3954 | 2.1917 | | |
| 0.3933 | 0.6526 | 2.7617 | | |
| 0.3117 | 0.6179 | −0.9450 | 0.6179 | 0.8184 |

Gear Tip

| | | | | |
|---|---|---|---|---|
| −0.5405 | | | | |
| 0.0855 | 0.5654 | 2.7278 | | |
| 0.7167 | 0.9779 | 3.2978 | | |
| 0.5493 | 0.9411 | −1.1488 | 0.9411 | 0.6698 |

Interference Point

| | | | | |
|---|---|---|---|---|
| −0.5600 | | | | |
| 0.0855 | 0.5908 | 2.8010 | | |
| 0.7712 | 1.0242 | 3.3710 | | |
| 0.5891 | 0.9890 | −1.1702 | 0.9890 | 0.6537 |

Additional Gear Flank Points

| | | | | |
|---|---|---|---|---|
| 0.8000 | | | | |
| −1.6138 | −1.1678 | 3.1654 | | |
| −0.1190 | −0.5609 | 3.7373 | | |
| −0.2811 | −0.8279 | 2.2321 | −0.8279 | 0.5835 |

Junction

| | | | | |
|---|---|---|---|---|
| 0.8950 | | | | |
| −2.0491 | −1.2305 | 3.4671 | | |
| −0.1251 | −0.6247 | 4.0393 | | |
| −0.3304 | −0.9582 | 2.4813 | −0.9582 | 0.5360 |

Additional Pinion Flank Points

| | | | | |
|---|---|---|---|---|
| −0.6000 | | | | |
| 0.0850 | 0.6445 | 2.9543 | | |
| 0.8911 | 1.1192 | 3.5190 | | |
| 0.6767 | 1.0892 | −1.2082 | 1.0892 | 0.6227 |

Junction

| | | | | |
|---|---|---|---|---|
| −0.6050 | | | | |
| 0.0849 | 0.6513 | 2.9727 | | |
| 0.9068 | 1.1310 | 3.5374 | | |
| 0.6882 | 1.1018 | −1.2125 | 1.1018 | 0.6191 |

Pinion Fillet Points

| rack x coord. | rack y coord. | fillet x coord. | fillet y coord. | fillet radius |
|---|---|---|---|---|
| 0.6882 | 1.1018 | 0.0849 | 0.6513 | 0.9586 |
| 0.7009 | 1.1143 | 0.0979 | 0.8138 | 0.7965 |
| 0.7151 | 1.1252 | 0.1331 | 0.9339 | 0.6884 |
| 0.7304 | 1.1343 | 0.1801 | 1.0253 | 0.6156 |
| 0.7468 | 1.1415 | 0.2342 | 1.0957 | 0.5669 |
| 0.7638 | 1.1467 | 0.2935 | 1.1499 | 0.5358 |
| 0.7814 | 1.1499 | 0.3568 | 1.1907 | 0.5184 |
| 0.7992 | 1.1510 | 0.4240 | 1.2193 | 0.5128 |
| 0.8170 | 1.1499 | 0.4949 | 1.2364 | 0.5184 |

Gear Fillet Points

| rack x coord. | rack y coord. | fillet x coord. | fillet y coord. | fillet radius |
|---|---|---|---|---|

-continued

Appendix III

| | | | | |
|---|---|---|---|---|
| −−0.9582 | −0.1251 | −0.6247 | 1.4297 | |
| −0.3530 | −1.0044 | −0.1712 | −0.8515 | 0.8373 |
| −0.3832 | −1.0461 | −0.2256 | −0.9673 | 0.6151 |
| −0.4200 | −1.0821 | −0.2828 | −1.0424 | 0.5145 |
| −0.4625 | −1.1112 | −0.3430 | −1.0955 | 0.4634 |
| −0.5093 | −1.1326 | −0.4063 | −1.1326 | 0.4363 |
| −0.5590 | −1.1457 | −0.4721 | −1.1561 | 0.4227 |
| −0.6103 | −1.1501 | −0.5398 | −1.1666 | 0.4186 |
| −0.6616 | −1.1457 | −0.6082 | −1.1644 | 0.4227 |

III. Design Results

| | | |
|---|---|---|
| Contact ratio | 1.1345 | |
| Pinion Member | | |
| Topland | 0.3271 | |
| Rack Tip Radius, Mate | 0.3000 | |
| Tip Relative Curvature | 0.7207 | |
| Tip Sliding | 1.7711 | |
| Load Radius | 2.879821 | |
| Load Pressure Angle | 34.45728 | |
| Moment | 2.374522 | |
| Junction Radius | 1.744715 | |
| Junction Half-width | .6172323 | |
| Junction Slope | −18.15204 | |
| Max Stress Position | 1.400011 | .5901293 |
| Max Stress Angle | 11.27666 | |
| Fillet Radius | .6433332 | |
| X-Factor | .235336 | |
| Stress Number | 4.776179 | |
| Gear Member | | |
| Topland | 0.4036 | |
| Rack Tip Radius, Mate | 0.1500 | |
| Tip Relative Curvature | 0.6698 | |
| Tip Sliding | 1.4850 | |
| Load Radius | 10.30951 | |
| Load Pressure Angle | 35.96324 | |
| Moment | 8.344458 | |
| Junction Radius | 9.332125 | |
| Junction Half-width | .9069593 | |
| Junction Slope | .2186156 | |
| Max Stress Position | 9.037935 | .9542542 |
| Max Stress Angle | 20.56732 | |
| Fillet Radius | .7077769 | |
| X-Factor | .7161195 | |
| Stress Number | 1.387665 | |

I claim:

1. A gear having a plurality of teeth, each tooth having a working surface contacting a working surface of a tooth of a meshing gear, a working surface of each tooth of the gear being between a top land and a bottom land defining a tooth height, and wherein the working surface has a profile with varying radius of curvature that is a minimum near a center of the tooth height and increases from that minimum monotonically toward both the top and bottom land.

2. A gear, having a first tooth-number of teeth, to be used with a meshing gear having a second tooth-number of teeth, wherein the teeth of each gear have working surfaces for contacting corresponding working surfaces on the teeth of the other gear at a sequence of poins of contact during a mesh interval, the working surfaces having profiles shaped such that at the points of contact during the mesh interval, a velocity ratio of motion transmission between the two gears is constant and equal to a ratio of the first and second tooth-numbers; the profiles having radii of curvature at each point of contact and a relative curvature equal to the sum of reciprocals of the radii of curvature; wherein the relative curvature is maximal near a center of the mesh interval and decreases monotonically from its maximum toward the ends of the mesh interval and vaires by more than 20 percent from its maximum over the mesh interval.

3. A gear according to claim 2 in which a difference in radii of curvature at the points of contact is constant.

4. A gear pair according to claim 2 in which the radii of curvature near the center of the mesh interval are the radii of the Wildhaber best circles.

5. A method of manufacturing a gear used with a meshing gear, the gears having tooth-numbers of teeth wherein the teeth of each gear have a working surface for contacting a corresponding working surface on the teeth of the other gear at a sequence of contact points during a mesh interval as the gears proceed about centers, the contact points during rotation forming a path of contact, the working surfaces having profiles such that, at all points of contact during the mesh interval, the velocity ratio of motion transmission between the gears is constant and equal to the ratio of the tooth-numbers and wherein the profiles have radii of curvature at each point of contact, the method comprising the steps of:

(a) selecting tooth-numbers, the distance between centers, and a slope of the path of contact at its intersection with a center line between the centers;

(b) employing a predetermined functional relationship of radii of curvature at the points of contact with traversal of the mesh interval to determine a differential equation describing the path of the points of contact during the mesh interval;

(c) integrating this differential equation to obtain points on the profile of the gear; and (d) making a gear according to these points.

6. The method of claim 5 in which the predetermined relationship is that the difference in radius of curvature between the two profiles at all points of contact remains constant.

* * * * *

UNITED STATES PATENT AND TRADEMARK OFFICE
CERTIFICATE OF CORRECTION

PATENT NO. : 5,271,289　　　　　　　　　　　　　　Page 1 of 2
DATED : December 21, 1993
INVENTOR(S) : Meriwether L. Baxter, Jr.

It is certified that error appears in the above-identified patent and that said Letters Patent is hereby corrected as shown below:

Col. 4, line 28,　　"as do the teet" should be --as do the teeth--.

Col. 7, line 42,　　"$\Delta X$ the above" should be --$\Delta X$ in the above--

Col. 8, line 14　　"pitch circle or 35" should be --pitch circle 33 or 35--

Col. 9, lines 23 and 29　　"Fillet Ratio" should be ----Fillet Radius--

Col. 9, line 40　　"$K_4L^4$" should be --$K_4L^4$ ...

Col. 9, line 43　　"readius curves" should be --radius curves--.

Col. 10, line 63　　"$QrRsin\phi$-0" should be --$QrRsin\phi = 0$--

Col. 12, line 35　　"P'A=CA' = CP'" should be --P'A=CA' - CP'--

Col. 13, line 46　　"Angular Thickness" should be --Angular Thicknesses--

UNITED STATES PATENT AND TRADEMARK OFFICE
CERTIFICATE OF CORRECTION

PATENT NO. : 5,271,289
DATED : December 21, 1993
INVENTOR(S) : Meriwether L. Baxter, Jr.

It is certified that error appears in the above-identified patent and that said Letters Patent is hereby corrected as shown below:

Col. 14, line 8          "2,5181" should be --2.5191--

Col. 15, line 4, first row          "-0.9582   -0.1251   0.06247   1.4297"

should be --   -0.3304   0.9582   -0.1251   0.06247   1.4297--

Col. 15, line 20    "Moment    2.374522" should be
                           --Moment    2.374552--

Col. 16, line 18    "vaires" should be --varies--.

Signed and Sealed this

Fifth Day of July, 1994

Attest:

BRUCE LEHMAN

Attesting Officer          Commissioner of Patents and Trademarks